Aug. 11, 1959 F. GREBNER 2,899,537
MANUFACTURE OF GIRDERS OR MESH
Filed Nov. 19, 1957 2 Sheets-Sheet 1
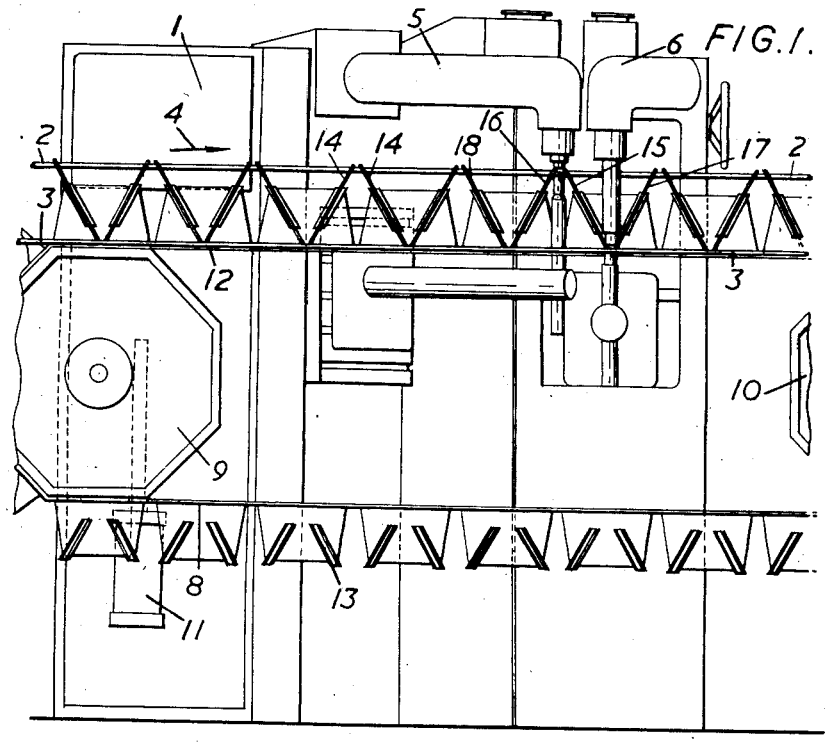
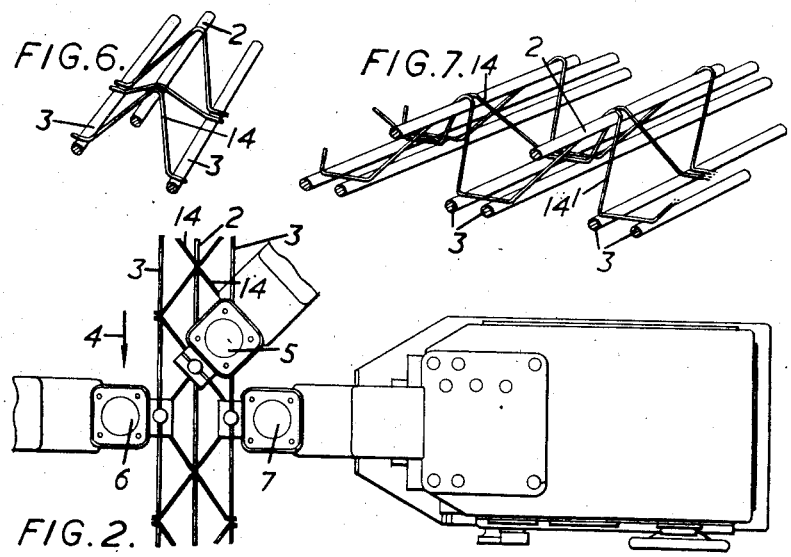
Inventor
Fritz Grebner
By
Dowell & Dowell
Attorneys

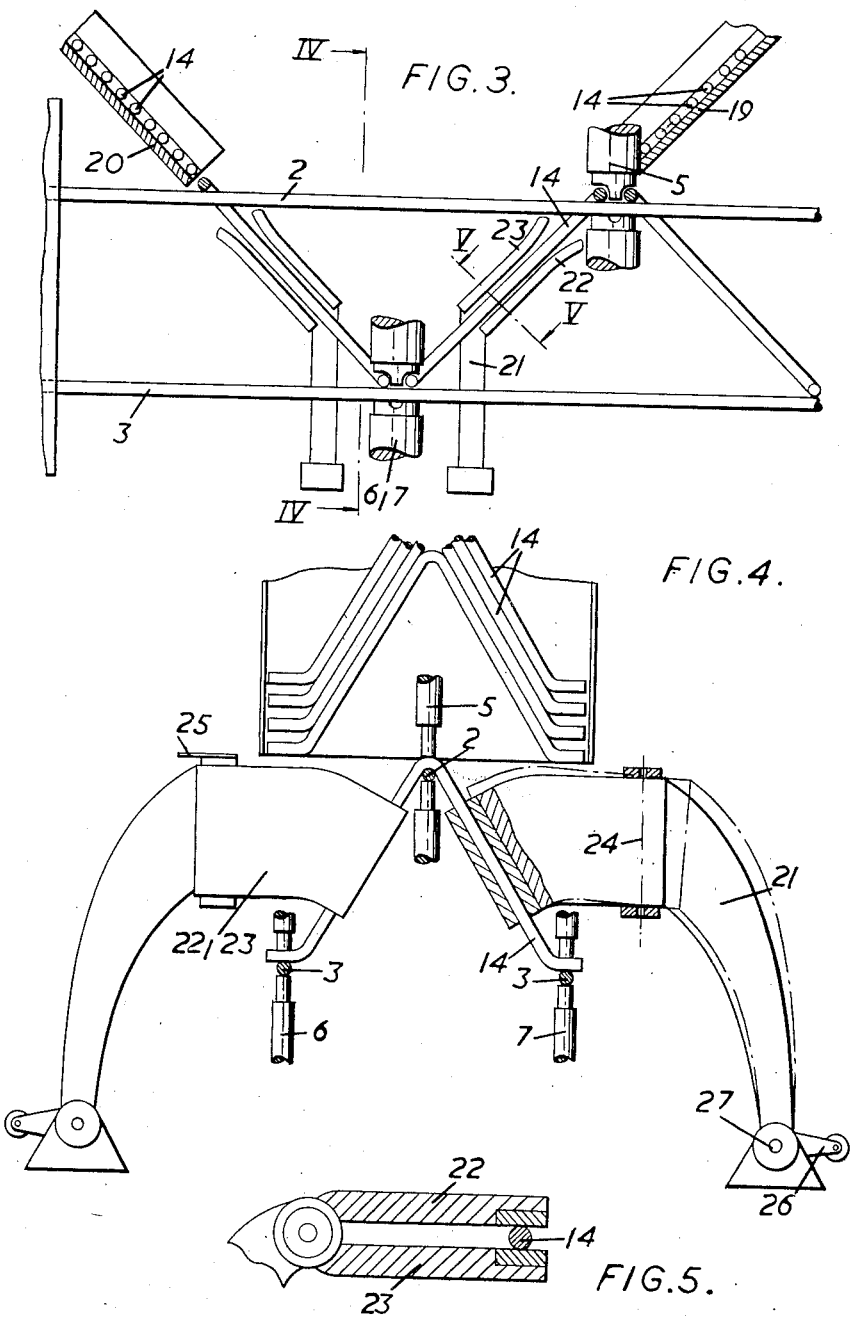

United States Patent Office 2,899,537
Patented Aug. 11, 1959

2,899,537

MANUFACTURE OF GIRDERS OR MESH

Fritz Grebner, Mainz (Rhine), Germany, assignor to Voigt & Haeffner A.G., Frankfurt am Main, Germany Application November 19, 1957, Serial No. 697,404

Claims priority, application Germany November 21, 1956

14 Claims. (Cl. 219—79)

The invention relates to welding machines.

More specifically, the invention concerns machines for making lattice girders made up from welded bar and/or wire stock and used principally as reinforcement for concrete.

The girders under consideration comprise at least three parallel chords having no common plane and connected together by lattice members each disposed in a plane inclined to the plane at right angles to the axes of the chords. However, the machines according to the invention may also be used for making flat latticed structural elements the chords of which all lie in the same plane.

The aim of the invention is to enable such girders to be mass-produced at a low cost.

According to the invention a machine for making girders of the kind set forth comprises means for feeding the chords together to and through a welding station, means for feeding the lattice members to the welding station and holding them in the desired angular relationship to the chords and welding means at the said station which are intermittently operated to weld each lattice member to each of the chords when such lattice member is at the welding station.

The accompanying drawings illustrate two examples of machines according to the invention for making lattice girders which are rigid in two planes.

In the drawings:

Figure 1 is a fragmentary side view of a machine according to the invention, in which the lattice members are fed by a conveyor belt or chain, Figure 2 is a fragmentary plan view of the machine shown in Figure 1, Figure 3 is a fragmentary side view of a different embodiment in which the lattice members are fed from magazines, Figure 4 is a fragmentary sectional elevation taken on the line IV—IV in Figure 3, Figure 5 is a fragmentary sectional elevation taken on the line V—V in Figure 3, and Figures 6 and 7 show typical lattice girders.

The machine shown in Figures 1 and 2 has been designed for the manufacture of the girder shown in Fig. 6 in which an upper chord 2 and two lower chords 3 having no common plane are connected together by V-shaped lattice members 14 each disposed in a plane inclined to the plane at right angles to the axes of the chords 2, 3. The chords 2, 3 are made from bar stock and the lattice members are of lighter section.

Referring to Figures 1 and 2, intermittently operated feeding means 1 move the chords 2, 3 together in the direction of the arrow 4, and are effective in two parallel planes.

Stationary means for spot welding the lattice members to the chords are indicated at 5, 6 and 7, each comprising one pair of electrodes. The means 5 have their electrodes located in the path of the upper chord 2 whilst the electrodes of the means 6 and 7 are located so as to weld the lattice members to the lower chords 3.

Below the zone in which the chords are moved, an endless conveyor belt 8 is mounted on two rollers 9 and 10, the roller 9 being rotated by a suitable drive 11. The drive 11 is such that the upper run 12 of the belt is moved parallel to and in the same direction as the chords and intermittently in synchronism with the movement of the chords. The lattice members 14 are received in rail-like sockets 13 on the belt in alternately oppositely inclined positions. The belt conveys the lattice members to the respective electrodes of the welding means which constitute the welding station of the machine. In the example as illustrated, the lattice member designated 15 is just being spot-welded to the upper chord 2 and to both lower chords 3, the lattice member 16 is being welded only to the upper chord 2 and the lattice member 17 only to the two lower chords 3. The member 17 was welded to the upper chord 2 during the preceding welding operation. After the aforementioned weld points have been made, the chords and the belt are advanced so that the lattice members are displaced by a distance equal to their pitch. In the new position, the next lattice member 18 will have assumed the position just vacated by the welded member 15.

The completed girder can be cut into suitable lengths which are automatically stacked by being nested one inside the other by means not illustrated.

In the example according to Figures 3 to 5, the lattice members 14 are stacked in the magazines 19 and 20 which are inclined at an angle equal to the slope of the lattice members in the finished girder. The planes in which the lattice members are fed by the magazines intersect the axes of the respective pairs of electrodes of the welding means 5, 6, 7 that is to say, the lattice members are brought into their correct position relatively to the chords at the welding station. In front of each magazine there is provided a locking mechanism (not shown) which releases one lattice member to fall on and straddle chords 2 and 3 for each advancing movement of the chords 2, 3.

After leaving the magazine, further guiding of the downwardly sliding diagonals is taken over by correspondingly inclined clamps 21 the two jaws 22 and 23 of which are in this case in an open and slightly tilted back position. Opening and closing of the jaws takes place about the pivotal axis 24 and can be effected at the appropriate moments by a control device (not shown) which engages the lever 25. The aforementioned tilting movement of the clamp 21 takes place about the axis 27 a suitable lever 26 also being provided for this purpose. The amount of tilting need merely be enough so that the jaws free a path for further advancing of the girder after the lattice members have been welded to the bars. The tilted back position is shown in broken lines in Figure 4.

After a lattice member 14 has been guided down through the open jaws 22 and 23, the clamp 21 is tilted into the engaging position as shown in Figure 4 and the jaws are closed so that they engage the lattice member on both sides and hold it in the welding position on the chords 2 and 3. At this instant or immediately thereafter the welding step is commenced by the pairs of electrodes of the means 5, 6, 7 so that, in a manner similar to that described with reference to Figures 1, 2, one lattice member is welded simultaneously to the upper and lower chords whilst the neighbouring lattice members are welded only to either the upper or lower chords whereafter the chords are advanced by a distance equal to the pitch of the lattice members and new members 14 are fed from the magazines.

Figure 7 illustrates a composite lattice girder having more than three chords interconnected by continuous lattice members 14'. The machines described with reference to Figures 1 to 5 can be designed to make such a composite girder by an appropriate duplication of parts.

I claim:

1. A machine for manufacturing constructional elements having at least three chords disposed in parallel relationship to each other and having no common plane and a series of connecting members of which successive members lie in planes oppositely inclined to a plane perpendicular to the axes of the chords, the said machine comprising a welding station at which are arranged a plurality of pairs of welding electrodes, one pair for each chord, means for feeding the chords in continuous lengths simultaneously in parallel relationship through said welding station and intermittently operated means for positioning said connecting members relatively to said chords at said welding station and holding them positioned while said electrodes are operated to weld them to the chords.

2. A machine as claimed in claim 1 in which said intermittently operated means comprise a conveyor adapted to convey the connecting members to the welding station while appropriately positioned relatively to said chords.

3. A machine as claimed in claim 2 in which the conveyor includes a plurality of holding means each of which is adapted to receive a connecting member and to hold this in the correct position relatively to the chords.

4. A machine as claimed in claim 1 in which said intermittently operated means are adapted to position the connecting members relatively to the chords before reaching the welding station and thereafter to convey them together with the chords to the welding station.

5. A machine as claimed in claim 1 in which said intermittently operated means are adapted to position the connecting members relatively to the chords immediately before welding occurs.

6. A machine as claimed in claim 5 in which the intermittently operated means comprises two magazines and one clamping means associated with each magazine, each magazine or clamp being so arranged that a connecting member fed from the magazine and held by the clamp is correctly positioned relatively to the chords.

7. A magazine as claimed in claim 6 wherein each clamp comprises two jaw members arranged for relative movement towards and away from each other so as either to clamp or release from clamping a connecting member.

8. A machine as claimed in claim 6 wherein each clamp is movable into and out from the path of the connecting members.

9. A machine for manufacturing constructional elements having three chords disposed in parallel relationship to each other and having no common plane and a series of connecting members of which successive members lie in planes oppositely inclined to a plane perpendicular to the axes of the chords, the said machine comprising a welding station at which are arranged three pairs of welding electrodes, one pair for each chord, means for feeding the chords simultaneously in parallel relationship through said welding station and intermittently operated means for positioning said connecting members relatively to said chords at said welding station and holding them positioned whilst said electrodes are operated to weld them to the chords, said intermittently operated means comprising two magazines and at least one clamp associated with each magazine, each magazine being positioned above the uppermost chord and arranged to feed connecting members thereto at the correct inclination, and each clamp being positioned below the uppermost chord to receive and hold in the correct position for welding a connecting member which has issued from the corresponding magazine.

10. A machine for manufacturing constructional elements having at least three chords disposed in parallel relationship to each other and having no common plane and a series of connecting members of which successive members lie in planes oppositely inclined to a plane perpendicular to the axes of the chords, the said machine comprising a welding station at which are arranged a plurality of pairs of welding electrodes, one pair for each chord, means for feeding the chords in continuous lengths simultaneously in parallel relationship through said welding station and intermittently operated means for positioning said connecting members relatively to said chords at said welding station and holding them positioned whilst said electrodes are operated to weld them to the chords, the connecting members being so arranged that each alternate member is positioned adjacent the succeeding member at its engagement with one chord and is positioned adjacent the preceding member at its engagement with the other two chords whereby each welding operation carried out by each pair of electrodes effects the welding of two connecting members to each chord.

11. A machine for manufacturing constructional elements having at least three chords disposed in parallel relationship to each other and having no common plane and a series of connecting members of which successive members lie in planes oppositely inclined to a plane perpendicular to the axes of the chords, the said machine comprising a welding station at which are arranged a plurality of pairs of welding electrodes, one pair for each cord, means for feeding the chords in continuous lengths simultaneously in parallel relationship through said welding station and intermittently operated means for positioning said connecting members relatively to said chords at said welding station and holding them positioned while said electrodes are operated to weld them to the chords, each connecting member being formed in a substantially V-shape, each end of the member being turned horizontally outwardly to form a lug.

12. A machine as claimed in claim 11 wherein each connecting member is positioned over the chords so that the apex of the V engages with and is supported by one chord and each lug respectively rests on one of the other chords.

13. A machine for manufacturing constructional elements having more than three chords disposed in parallel relationship to each other and having no common plane and a series of connecting members of which successive members lie in planes oppositely inclined to a plane perpendicular to the axes of the chords, the said machine comprising a welding station at which are arranged a plurality of pairs of welding electrodes, one pair for each chord, means for feeding the chords in continuous lengths simultaneously in parallel relationship through said welding station and intermittently operated means for positioning said connecting members relatively to said chords at said welding station and holding them positioned while said electrodes are operated to weld them to the chords, in which each connecting member has the shape of a number of substantially V-shaped projections, each V being connected by a horizontal length and each outer end of the member having an outwardly extending horizontal lug.

14. A machine as claimed in claim 13 wherein each connecting member is positioned over the chords so that the apex of each V engages with and is supported by a chord and each horizontal length and lug rests on one of the other chords respectively.

References Cited in the file of this patent

UNITED STATES PATENTS

| | | |
|---|---|---|
| 1,448,566 | Muller | Mar. 13, 1923 |
| 1,753,070 | Schwartz et al. | Apr. 1, 1930 |
| 2,529,556 | Keller | Nov. 14, 1950 |
| 2,616,015 | Glasener et al. | Oct. 28, 1952 |